United States Patent [19]

Kiya et al.

[11] Patent Number: 4,878,171
[45] Date of Patent: Oct. 31, 1989

[54] NUMERICAL CONTROL METHOD FOR MACHINING AN ARC ON THE CURVED SURFACE OF A CYLINDER USING INTERPOLATION OF LINEAR AND ANGULAR DATA

[75] Inventors: Nobuyuki Kiya; Kimio Maeda, both of Hachioji, Japan

[73] Assignee: Fanuc Ltd., Minamitsuru, Japan

[21] Appl. No.: 221,247

[22] PCT Filed: Dec. 9, 1987

[86] PCT No.: PCT/JP87/00956

§ 371 Date: Jun. 29, 1988

§ 102(e) Date: Jun. 29, 1988

[87] PCT Pub. No.: WO88/04799

PCT Pub. Date: Jun. 30, 1988

[30] Foreign Application Priority Data

Dec. 18, 1986 [JP] Japan ............................ 61-300032

[51] Int. Cl.$^4$ .................................... G05B 19/41
[52] U.S. Cl. ..................... 364/474.29; 364/474.31; 318/573
[58] Field of Search .............. 364/474.28, 474.29, 364/474.31; 318/570, 573, 574

[56] References Cited

U.S. PATENT DOCUMENTS 4,031,369 6/1977 Heaman et al. ................. 364/474.29
4,704,688 11/1987 Kamata ........................ 364/474.29

Primary Examiner—Jerry Smith
Assistant Examiner—James J. Kulbaski
Attorney, Agent, or Firm—Staas & Halsey

[57] ABSTRACT

A numerical control method is provided which is capable of forming a circular arc on a cylindrical surface of a cylindrical workpiece with high accuracy by the use of a simplified program. At first, a circumferential distance interval between the start and end points of a circular arc to be machined is calculated on the basis of a moving command value for a rotation axis indicative of an angular interval in the circumferential direction of the workpiece (S3). Then, a circular arc interpolation processing is executed on the thus calculated distance interval and a moving command value for a linear axis indicative of an interval between the start and end points in the axial direction of the workpiece, to thereby calculate distribution amounts for the rotation and linear axes, respectively (S4). Further, control along the linear axis is performed in accordance with the distribution amount for the same axis obtained by the interpolation processing, and at the same time, control around the rotation axis is performed in accordance with a distribution amount represented by a unit of angle, which is obtained by a length/angle conversion of the distribution amount for the rotation axis obtained by the interpolation processing (S6, S7), to thereby carry out circular arc machining.

8 Claims, 2 Drawing Sheets

4,878,171

NUMERICAL CONTROL METHOD FOR MACHINING AN ARC ON THE CURVED SURFACE OF A CYLINDER USING INTERPOLATION OF LINEAR AND ANGULAR DATA

BACKGROUND OF THE INVENTION

1. Field of the Invention

The present invention relates to a numerical control method for forming a circular arc on a cylindrical surface of a cylindrical workpiece.

2. Description of the Related Art

Conventionally, it has been known to utilize a linear interpolation function of a numerical control unit to effect simultaneous control concerning a rotation axis and a linear axis of a machine tool. Using this function, a tool and a cylindrical workpiece, respectively mounted on the machine tool, are moved relative to each other along a desired machining locus, to thereby form a circular arc on a cylindrical surface of the workpiece. According to the above-mentioned conventional method, however, it is required to set machining conditions for a respective one of a plurality of sections obtained by finely dividing the machining locus. As a consequence, a program for effecting the circular arc machining on the cylindrical workpiece consists of complicated statements. This requires effort for preparation of the program. On the other hand, if a dividing number of the machining locus is decreased for ease of preparation of the program, a drawback occurs in that machining accuracy decreases.

SUMMARY OF THE INVENTION

The object of the present invention is to provide a numerical control method which is capable of performing circular arc machining on a cylindrical workpiece with high accuracy while using a simplified program.

In order to achieve the above-mentioned object, according to the present invention, a numerical control method is provided, in which simultaneous control concerning a rotation axis and a linear axis of a machine tool is effected by means of a numerical control unit which operates in accordance with a machining program, so that a circular arc is formed on a cylindrical surface of a cylindrical workpiece.

In this numerical control method, a distance interval, in the circumferential direction of the workpiece between a start point and an end point of a circular arc to be formed, is calculated on the basis of a moving command value for the rotation axis. The moving command value value is indicative of an angular interval between the start and end points of the circular arc in the circumferential direction of the workpiece and is represented by a unit of angle. Next, a circular arc interpolation processing is executed on the basis of the thus calculated distance interval and a moving command value for the linear axis, which is represented by a unit of length, so as to calculate a first distribution amount for the rotation axis and a second distribution amount for the linear axis, respectively. The first distribution amount is converted into a third distribution amount which is represented by a unit of angle. Then, the linear and rotation axes are controlled in accordance with the second and third distribution amounts, respectively.

In this manner, according to the present invention, the distribution amounts for the rotation and linear axes are obtained by effecting the circular arc interpolation processing on the basis of the value, obtained by the angle/length conversion of the moving command value for the rotation axis, and the moving command value for the linear axis. Control along the linear axis is then performed in accordance with the thus obtained distribution amount for the linear axis. The control around the rotation axis is performed in accordance with the distribution amount, which is represented by the unit of angle and obtained by the length/angular conversion of the distribution amount for the rotation axis, obtained by the circular arc interpolation processing. Therefore, the control for the rotation and linear axes can be carried out so that a tool and the workpiece are moved relative to each other along a desired machining locus, only by setting, in general, the moving command values for the rotation and linear axes. In other words, it is possible to form the circular arc on the cylindrical workpiece with a simplified program.

DESCRIPTION OF THE PREFERRED EMBODIMENT

Figure 3:
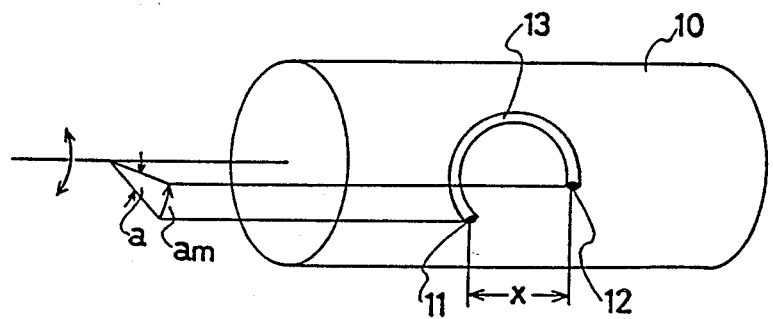
FIG. 3 is a schematic perspective view showing, by way of example, a circular arc formed on a cylindrical workpiece.

A numerical control unit (not shown), to which a numerical control method of an embodiment of the present invention is applied, is operable to drive motors for rotation and linear axes of a machine tool so that a tool (not shown) and a cylindrical workpiece 10 (FIG. 3), respectively mounted on the machine tool, are moved relative to each other around the rotation axis of the machine tool and along the linear axis thereof.

Figure 1:
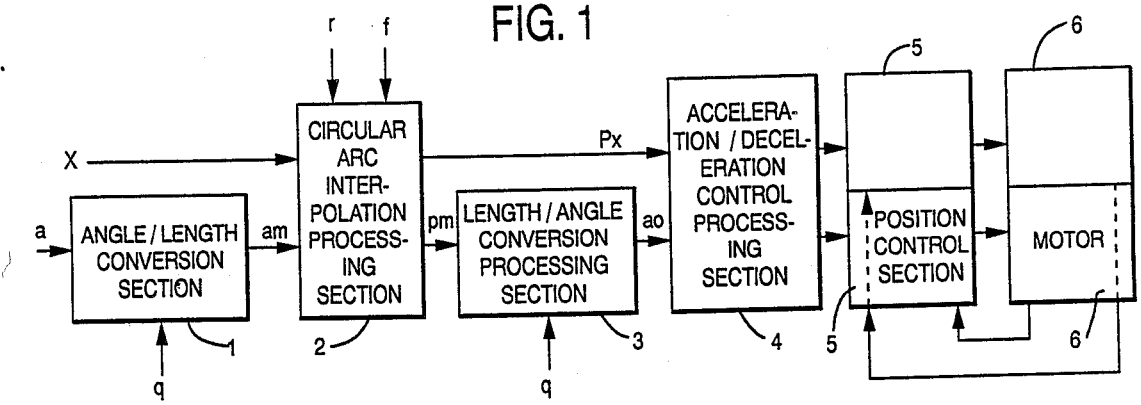
FIG. 1 is a function diagram showing a numerical control unit embodying a numerical control method according to an embodiment of the present invention.
Figure 4:
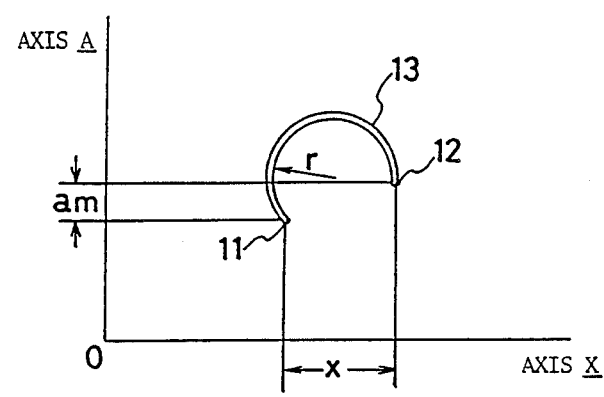
FIG. 4 is a view showing the circular arc formed on the cylindrical workpiece in FIG. 3.

As shown in FIG. 1, the numerical control unit comprises an angle/length conversion section 1 in which a moving command value a for the rotation axis for formation of a circular arc 13 (FIG. 3) on the cylindrical workpiece 10 is input. More specifically, the moving command value a is an angular interval a, in the circumferential direction of the workpiece 10, between start and end points 11, 12 of a circular arc 13 to be machined (machining locus). The interval a is represented by a unit of angle (in degrees), and is converted into a distance interval am, represented a unit of length (in millimeters), between the start and end points 11, 12 of the circular arc 13 in the circumferential direction of the workpiece 10. The abovementioned angle/length conversion processing is executed in accordance with the following equation:

$$am = \pi \cdot q \cdot a / 360 \qquad (1)$$

where q is the diameter of the workpiece 10. In the meantime, the circular arc 13 is represented by part of a circle having a radius of r when the same arc is developed on a plane (FIG. 4).

Next, conventional circular arc interpolation processing is executed in a circular arc interpolation processing section 2. This processing is carried out on the basis of the calculated distance interval am and a moving command value x for the linear axis (X axis) for formation of the circular arc 13. The moving command x is the distance interval, represented by a unit of length (in millimeters), between the start and end points 11, 12 of the circular arc 13 in the axial direction of the workpiece 10. This processing is also carried out in consideration of the circular arc machining direction and the relative feed rate f between the tool and the workpiece 10. Further, in a length/angle conversion processing section 3, a distribution amount Pm, represented by a unit of length, for the rotation axis (A axis), which amount is obtained by the circular arc interpolation processing, is converted into a distribution amount ao represented by a unit of angle in accordance with the following equation:

$$ao = Pm \cdot 360 / \pi \cdot q \qquad (2)$$

A distribution amount Px for the linear axis, obtained by the circular arc interpolation processing and represented by a unit of length, and the distribution amount ao for the rotation axis, obtained by the length/angle conversion processing and represented by a unit of angle, are subjected to a known acceleration/deceleration processing in an acceleration/deceleration control processing section 4, and are then respectively supplied to position control sections or servo circuits 5, for instance. The position control sections or servo circuit 5 receive feedback signals indicative of current rotational positions of the motors 6 for the linear and rotation axes. Further, the linear and rotation axes are driven by the motors 6 and controlled by the position control sections 5, so that the tool and the workpiece 10 are moved relative to each other, to form a desired circular arc 13 on the cylindrical workpiece 10.

Figure 2:
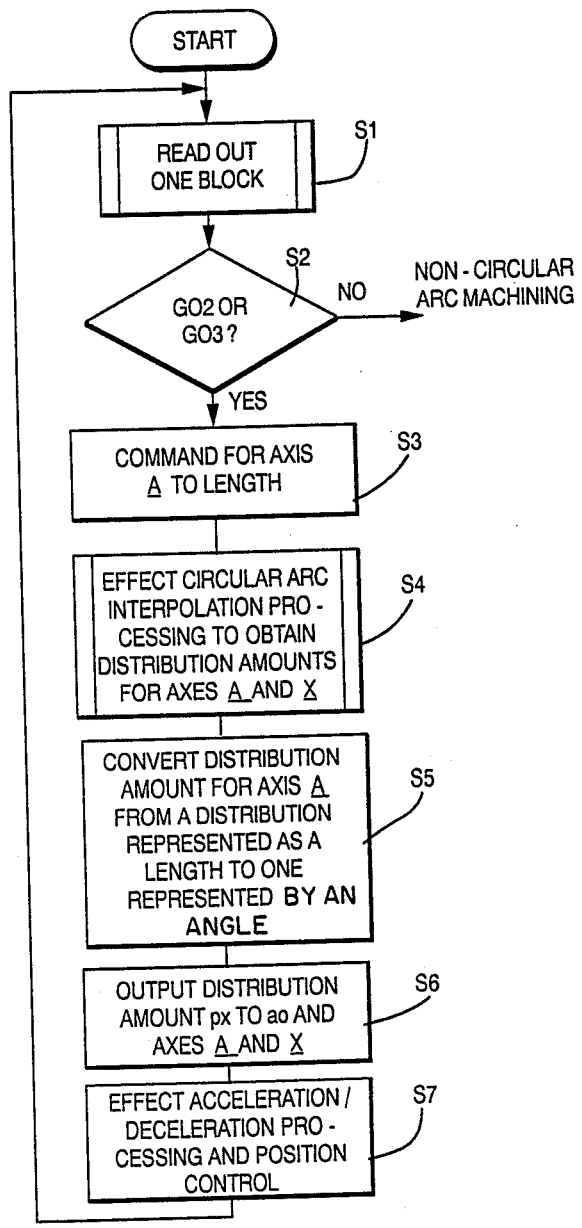
FIG. 2 is a flowchart showing the method which outlines the embodiment of the present invention illustrated in FIG. 1.

In the following, the operation of the numerical control unit will be further explained with reference to FIG. 2.

As mentioned above, the numerical control unit executes various control operations, including the above-mentioned circular arc machining control, in accordance with an NC machining program, which includes therein a circular arc machining program containing the following two kinds of formats:

| G02 Aa Xx Rr Qq Ff; and |
|---|
| G03 Aa Xx Rr Qq Ff | where G02 represents a clockwise direction circular arc command code, and G03 represents a counterclockwise direction circular arc command code. In both formats, A represents a rotation axis feed function; X, a linear feed function; R, a circular arc radius specifying function; Q, a workpiece diameter specifying function; and F, a feed function. Further, a, x, r, q, and f each represent a command value of a corresponding parameter. More particularly, the command value a is represented by a unit of degree, and the command value f is represented by a unit in millimeter/minutes, and the other command values are represented by units of millimeters.

During the operation of the numerical control unit, the numerical control unit reads out one block from the NC machining program (the step S1), and determines whether the code G02 or the code G03 is described in the block concerned (the step S2). If neither of these codes is described, control is shifted to a processing (not shown) other than the circular arc machining. On the other hand, if either the code G02 or the code G03 is found, the numerical control unit converts the moving command value a for the rotation axis, represented by a unit of angle, into a corresponding value am having a unit of length, in accordance with the above-mentioned equation (1) and by the use of the workpiece diameter value q specified in the block concerned (the step S3). Next, the numerical control unit executes the circular arc interpolation processing on the basis of the moving command value x for the linear axis, the radius r of the circular arc to be machined, the feed rate f, and the machining direction represented by the code G02 or G03; (these four parameters are respectively described in the block concerned), as well as the value am mentioned above, so as to obtain the respective distribution amounts Px, Pm for the rotation and linear axes (the step S4). Further, the distribution amount Pm for the rotation axis, represented by a unit of length, is converted into the distribution amount ao, represented by a unit of angle, in accordance with the equation (2) and by the use of the workpiece diameter q stated in the block concerned (the step S5). Then, the numerical control unit outputs the distribution amounts ao and Px to the rotation and linear axes, respectively (the step S6), and performs the acceleration/deceleration processing and the position control (the step S7). Thereafter, the control is returned to the step S1. As a consequence, the above-mentioned circular arc machining is carried out.

We claim:

1. A numerical control method in which controls around a rotation axis and along a linear axis of a machine tool are simultaneously performed by a numerical control unit which operates in accordance with a machining program, so that a circular arc is formed on a cylindrical surface of a cylindrical workpiece, comprising the steps of:
    (a) calculating a distance interval, in a circumferential direction of the workpiece, between a start point and an end point of a circular arc to be formed on the basis of a moving command value for the rotation axis, the moving command value being indicative of an angular interval between the start and end points of the circular arc in the circumferential direction of the workpiece and represented by a unit of angle;
    (b) executing a circular arc interpolation processing on the calculated distance interval for the rotation axis and a moving command value for the linear axis, which is represented by a unit of length, so as to calculate a first distribution amount for the rotation axis and a second distribution amount for the linear axis, respectively;
    (c) converting the first distribution amount into a third distribution amount which is represented by a unit of angle; and
    (d) controlling the linear and rotation axes of the machine tool in accordance with the second and third distribution amounts, respectively.

2. A numerical control method according to claim 1, wherein said machining program includes therein a command value representing a diameter of the workpiece, and said distance interval calculating step (a) and said converting step (c) are respectively executed using the workpiece diameter command value.

3. A numerical control method according to claim 2, wherein said circular arc to be machined is represented by part of a circle when it is developed in a plane, and said machining program includes a command value of a radius of the circle part, a code indicative of a circular arc machining direction, and a command value of a feed rate, and said circular arc interpolation processing step (b) is executed using said command values of the radius and the feed rate, and said code.

4. A numerical control method according to claim 1, wherein said circular arc to be machined is represented by part of a circle when it is developed in a plane, and said machining program includes a command value of a radius of the circle part, a code indicative of a circular arc machining direction, and a command value of a feed rate, and said circular arc interpolation processing step (b) is executed using said command values of the radius and the feed rate, and said code.

5. A method for forming a circular arc on a cylindrical surface of a cylindrical workpiece mounted on a machine tool, comprising the steps of:
 (a) calculating a distance interval for a circumferential direction of the workpiece between a start point and an end point of the circular arc from a moving command value for a rotation axis of the machine tool;
 (b) circular arc interpolation processing the calculated circumferential distance interval to obtain a first distribution amount for the rotation axis;
 (c) simultaneously circular arc interpolation processing a moving command value for a linear axis of the machine tool to obtain a second distribution amount for the linear axis; and
 (d) controlling the rotation and linear axes of the machine tool with the first and second distribution amounts, respectively, to form the circular arc.

6. A method for forming a circular arc on a cylindrical surface of a cylindrical workpiece according to claim 5, further comprising, after said step (c), the step of:
 (e) converting the first distribution amount from a unit of length to a unit of angle.

7. A method for forming a circular arc on a cylindrical surface of a cylindrical workpiece according to claim 6, wherein said steps (a) and (e) further comprise using a value representing the diameter of the workpiece in calculating the distance interval and in converting the first distribution amount, respectively.

8. A method for forming a circular arc on a cylindrical surface of a cylindrical workpiece according to claim 7, wherein a tool for forming the circular arc is also mounted on the machine tool, and said steps (b) and (c) further comprise using a relative feed rate between the workpiece and the tool and a value representing the radius of a part circle developed by the circular arc on a plane in obtaining the first and second distribution amounts, respectively.

* * * * *